Jan. 23, 1951
D. H. DASHIELL
OUTPUT AND INPUT CIRCUIT FOR MAGNETIC RECORDING SYSTEMS
Filed Nov. 24, 1947
2,539,121
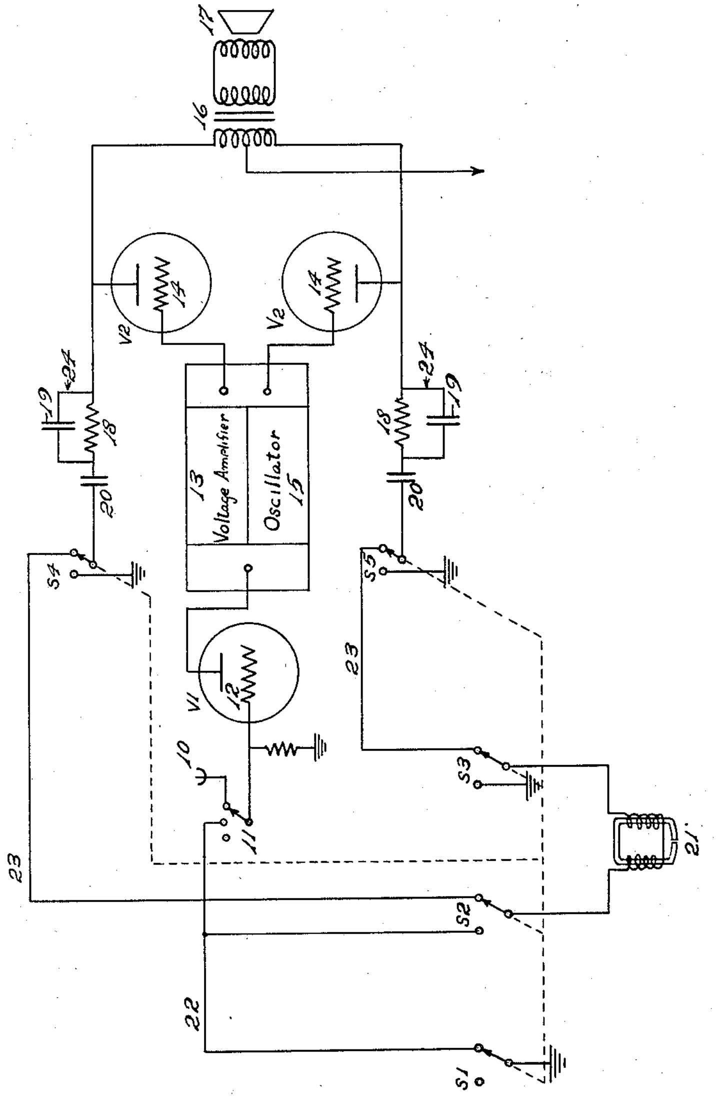
INVENTOR.
Daniel H. Dashiell
BY
Symmestvedt & Lechner
ATTORNEYS.

Patented Jan. 23, 1951

2,539,121

UNITED STATES PATENT OFFICE 2,539,121

OUTPUT AND INPUT CIRCUITS FOR MAGNETIC RECORDING SYSTEMS

Daniel H. Dashiell, Philadelphia, Pa., assignor to The International Electronics Company, Philadelphia, Pa., a corporation of Pennsylvania Application November 24, 1947, Serial No. 787,639

7 Claims. (Cl. 179—100.2)

This invention relates to magnetic recording systems, and, more particularly, has to do with the selective establishment of recording and reproducing conditions.

In magnetic recording and reproducing systems in which the same head and the same amplifier are used during both recording and reproducing, the circuits by which the magnetic head is switched from the amplifier output to the amplifier input present serious problems if coupling between the output and the input of the amplifier is to be avoided.

While this problem arises in all magnetic recording systems in which the same elements are used during both phases of operation, the problem is particularly acute in systems designed for operation over a broad frequency range where the high-voltage amplification required for such operation, together with the excellent transmission characteristics of the amplifier at the higher frequencies, render prohibitive the presence of even a very low impedance common to the output and input circuits or very low capacity between the output and input circuits.

It is a principal object of the present invention to substantially eliminate the possibility of energy transfer from the output of a recording and reproducing amplifier to the input circuit.

How this object is accomplished will be more readily understood upon reference to the accompanying drawing and to the description which follows immediately below.

The single figure is a fragmentary showing of the circuits of a magnetic recording and reproducing system of the general type more fully disclosed and explained in the copending application of Lloyd J. Bobb, Serial No. 787,644, filed concurrently herewith, assigned to the assignee of the present invention, and entitled Magnetic Recording and Reproducing Circuits.

The general mode of operation of the circuit disclosed in the figure is as follows: When the apparatus is adjusted for recording, a signal from a course (not shown) is delivered to the jack 10 and is thence conducted by a selector switch 11 to the grid 12 of an input vacuum tube V—1. This signal is further amplified in an amplifier generally indicated at 13 and is delivered to the grid 14 of a power amplifier vacuum tube V—2, or, as is shown in the figure, the power output stage may comprise a pair of tubes V—2 arranged in a push-pull circuit. The output of an oscillator generally indicated at 15, arranged to oscillate at a frequency substantially above the highest frequency to be recorded, is also delivered to the grid or grids of the power amplifier tube or tubes V—2. The output of the power amplifier stage is delivered by means of an output transformer 16 to a loudspeaker or other acoustical device 17. In addition, the output voltage developed by the power amplifier tube or tubes is adapted to be connected to the magnetic recording head through a series impedance comprising, for example, a series resistance 18 bypassed by a capacitor 19 and a blocking capacitor 20. As is more fully pointed out in the copending application of Lloyd J. Bobb above referred to, resistance 18 and capacitor 19 are selected to present a comparatively high impedance to audio frequencies and a comparatively low impedance to currents of the polarizing frequency. Thus, when the apparatus is adjusted for recording, both audio recording currents and the polarizing current are simultaneously delivered to the magnetic head 21, and, in addition, audio currents are transferred to loudspeaker 17, providing for monitoring of the recording.

When the apparatus is adjusted for reproducing, the voltage induced in the head 21 upon the translation of a magnetic record in relation thereto, is delivered to the grid 12 of vacuum tube V—1 and then passes through the amplifier and is delivered to loudspeaker 17.

It will thus be seen that it is necessary to connect magnetic head 21 alternatively with both the input and the output of the amplifier. In prior magnetic recording and reproducing systems with which I am familiar, it was necessary to arrange the wiring and locate the switch contacts with great care in order to avoid capacitative coupling between the input and output of the amplifier.

According to the present invention, I have found that in magnetic recording and reproducing systems of the type in which a network having relatively high impedance at audio frequencies is interposed between the amplifier output and the recording head, the conductor which is employed to connect the network with the magnetic head during recording may be grounded during reproduction without substantial effect upon the reproduction of the signal.

This is possible because the shunting effect of the filter upon the output circuit of the amplifier is negligible due to the high impedance of the filter at audio frequencies.

As will be seen in the figure, I employ a 5-section double-throw switch, which may be of any convenient construction. Switch section S—1 has the sole function of grounding the conductor 22 leading from selector 11 when the apparatus is adjusted for recording. Switch section 2 is adapted to connect one side of magnetic head 21 alternatively to conductor 22 or to conductor 23 leading to the network generally indicated at 24. Switch section 3 serves to alternatively ground the second side of magnetic head 21 or to connect it to the second conductor 23 leading to the second filter 24. Switch section 4 serves to ground the first filter 24 when the apparatus is adjusted for reproducing and switch section 5 performs a similar function in connection with the second network 24.

It will be understood that while I have illustrated the invention as applied to a push-pull output stage, it is equally applicable to a single-ended amplifier, in which case switch sections 3 and 5 would be eliminated and one side of magnetic head 21 permanently grounded.

Thus, according to the invention, when the apparatus is adjusted for recording, the conductor 22 leading to the input circuit is grounded, and when the apparatus is adjusted to play back a recording, the filter or filters 24 are grounded. It will therefore be apparent that there can never be a condition in which one portion of the switch is connected to the input circuit of the amplifier and another portion of the switch is connected to the output circuit, with the result that the possibility of coupling between the input and output circuits through the switch assembly is eliminated in an extremely simple manner.

I claim:

1. A magnetic recording and reproducing system for use with a source of signals to be recorded, comprising a recording-reproducing amplifier, a magnetic recording-reproducing head, a high impedance filter connected to the output of said amplifier, a switch for connecting the amplifier input to the source and the head to the filter output for recording, and for connecting the head to the amplifier input for reproducing, and means for grounding the filter output when the head is connected to the amplifier input.

2. A magnetic recording and reproducing system for use with a source of signals to be recorded, comprising a recording-reproducing amplifier, a magnetic recording-reproducing head, a high impedance filter connected to the output of said amplifier, a switch for connecting the amplifier input to the source and the head to the filter output for recording, and for connecting the head to the amplifier input for reproducing, and a contact on the switch for grounding the filter output when the head is connected to the amplifier input.

3. A magnetic recording and reproducing system for use with a source of signals to be recorded comprising a recording-reproducing amplifier including an output discharge tube having an anode; a magnetic recording-reproducing head; a high impedance filter connected to said anode; a switch for connecting the head alternatively to the filter output and to a conductor; a second switch for alternatively connecting the amplifier input to said source and said conductor; and contacts on said first switch for grounding said conductor when the head is connected to the filter and for grounding the filter output when the head is connected to the conductor.

4. A magnetic recording and reproducing system for use with a source of signals to be recorded; comprising a magnetic recording-reproducing head; a magnetic recording-reproducing amplifier including a pair of push-pull output discharge tubes, each having an anode; a high impedance filter connected to each of said anodes, a conductor associated with the amplifier input; a first switch for alternatively connecting the amplifier input with said conductor and said source; and a second switch for alternatively connecting the head to the output terminals of said filters and to said conductor; and contacts on said second switch for grounding said conductor when the head is connected to the filters and for grounding the filter output terminals when the head is connected with said conductor.

5. In a magnetic recording and reproducing system, a recording and reproducing head; a recording and reproducing amplifier comprising an input tube having a grid and an output tube having an anode; an acoustical device coupled to said anode by a transformer; a first conductor; series impedance means interposed between said anode and said conductor; a second conductor; switch means adapted to connect said second conductor to said grid; and second switch means for establishing alternatively either of two conditions: first, a condition in which said first conductor is connected to said head and said second conductor is grounded; and, second, a condition in which said second conductor is connected to said head and said first conductor is grounded.

6. In a magnetic recording and reproducing system, a recording and reproducing head; a recording and reproducing amplifier comprising an input tube having a grid and an output tube having an anode; a first conductor; a series impedance interposed between said anode and said conductor; a second conductor; first switch means adapted to connect said second conductor to said grid; and second switch means for establishing alternatively either of two conditions: first, a condition in which said first conductor is connected to said head and said second conductor is grounded; and, second, a condition in which said second conductor is connected to said head and said first conductor is grounded.

7. A magnetic recording and reproducing system comprising a recording-reproducing amplifier, a magnetic recording head, a conductor, a circuit element having high impedance at audio frequencies connected at one end to the amplifier output and at the other end to the conductor, and switch means for connecting the head to the conductor during recording and for grounding the conductor during reproducing.

DANIEL H. DASHIELL.

REFERENCES CITED

The following references are of record in the file of this patent:

UNITED STATES PATENTS

| Number | Name | Date |
|---|---|---|
| 2,306,162 | Gipe | Dec. 22, 1942 |
| 2,351,005 | Camras | June 13, 1944 |

Certificate of Correction

Patent No. 2,539,121 January 23, 1951

DANIEL H. DASHIELL

It is hereby certified that error appears in the printed specification of the above numbered patent requiring correction as follows:

Column 1, line 44, for the word "course" read *source*;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*